United States Patent [19]
Cafiero

[11] Patent Number: 5,580,343
[45] Date of Patent: Dec. 3, 1996

[54] REFILLABLE DUMBBELL AND BOTTLE HOLDING DEVICE FOR FORMING A REFILLABLE DUMBBELL IN CONJUNCTION WITH A BOTTLE

[76] Inventor: Harry A. Cafiero, 1135-51st St., North Bergen, N.J. 07047

[21] Appl. No.: 305,721

[22] Filed: Sep. 14, 1994

[51] Int. Cl.⁶ .............................. A63B 21/00; A47J 45/07; B65D 23/10
[52] U.S. Cl. .................... 482/139; 482/108; 482/111; 482/908; 215/396; 220/741; 220/759; 294/27.1
[58] Field of Search ............................. 482/93, 106, 108, 482/111, 139, 908, 74, 109; 215/100 A, 386, 395, 396, 399; 294/32–34, 27.1, 30; 220/741, 742, 755, 757, 758, 759; 248/316.4; D7/394; D9/536

[56] References Cited

U.S. PATENT DOCUMENTS

| | | | |
|---|---|---|---|
| D. 292,160 | 10/1987 | Thomas | 294/32 |
| 356,895 | 2/1887 | Sangster | 220/755 |
| 511,209 | 12/1893 | Parker | 215/395 |
| 547,713 | 10/1895 | Courtenay | 215/100 A |
| 615,460 | 12/1898 | Parker | 215/395 |
| 1,373,695 | 4/1921 | Wright | 215/100 A |
| 1,702,555 | 2/1929 | Watson | 294/32 |
| 2,559,190 | 7/1951 | Hallstream | 294/34 |
| 2,905,500 | 9/1959 | Thombs | 220/759 |
| 3,076,223 | 2/1963 | Reichold | 294/34 |
| 3,414,311 | 12/1968 | Trimboli | 294/34 |
| 3,825,151 | 7/1974 | Arnaud | 220/741 |
| 3,979,011 | 9/1976 | Schleicher | 294/34 |
| 4,079,932 | 3/1978 | Schuetz | 482/108 |
| 4,199,140 | 4/1980 | Ferretti | 482/106 |
| 4,379,578 | 4/1983 | Schuler . | |
| 4,651,988 | 3/1987 | Sobel | 482/93 |
| 4,708,254 | 11/1987 | Byrns . | |
| 4,712,794 | 12/1987 | Hall | 482/108 |
| 4,773,549 | 9/1988 | Avraham . | |
| 4,823,975 | 4/1989 | Schwankl | 294/34 |
| 4,865,208 | 9/1989 | Lax et al. . | |
| 4,932,544 | 6/1990 | Glazer . | |
| 5,101,998 | 4/1992 | Hwang | 215/100 A |
| 5,335,954 | 8/1994 | Holub et al. | 294/32 |

FOREIGN PATENT DOCUMENTS

| | | | |
|---|---|---|---|
| 0859553 | 12/1970 | Canada | 294/34 |
| 0522519 | 8/1921 | France | 215/100 A |
| 0699989 | 2/1931 | France | 215/100 A |
| 0091584 | 4/1958 | Norway | 215/100 A |
| 0000301 | 1/1880 | United Kingdom | 215/100 A |
| 711168 | 6/1954 | United Kingdom | 294/27.1 |
| 919799 | 2/1963 | United Kingdom | 294/32 |

OTHER PUBLICATIONS

"All–over body workout", Fitness, Mar./Apr. 1994, p. 83.
Hanteens, advertisement in Runner's World, Nov. 1990, p. 111, Rainbow Racing System, class 482, sub 108.

Primary Examiner—Stephen R. Crow
Assistant Examiner—Victor K. Hwang
Attorney, Agent, or Firm—Richard M. Goldberg

[57] ABSTRACT

A bottle holding device for forming a refillable dumbbell in conjunction with a bottle of the type including a main body portion which is closed at a bottom thereof and which tapers at an upper portion thereof to a reduced diameter neck having a reclosable bottle opening, the bottle holding device including an upper bottle engaging section for engaging the tapered upper portion of the bottle, a lower bottle engaging section for engaging the bottom of the bottle, and an adjustable tensioning handle assembly for pulling the upper and lower bottle engaging sections toward each other with an adjustable force when the bottle holding device is assembled with the bottle, so as to tightly grip the bottle therebetween, and for enabling a person to grasp the tensioning handle assembly to perform dumbbell exercises, the tensioning handle assembly including a lower lateral extension which extends outwardly from the lower bottle engaging section, an upper lateral extension which extends outwardly from the upper bottle engaging section, and a handle tightened between the lower lateral extension and the upper lateral extension so as to pull the lower and upper lateral extensions toward each other when the bottle holding device is assembled with the bottle.

6 Claims, 4 Drawing Sheets

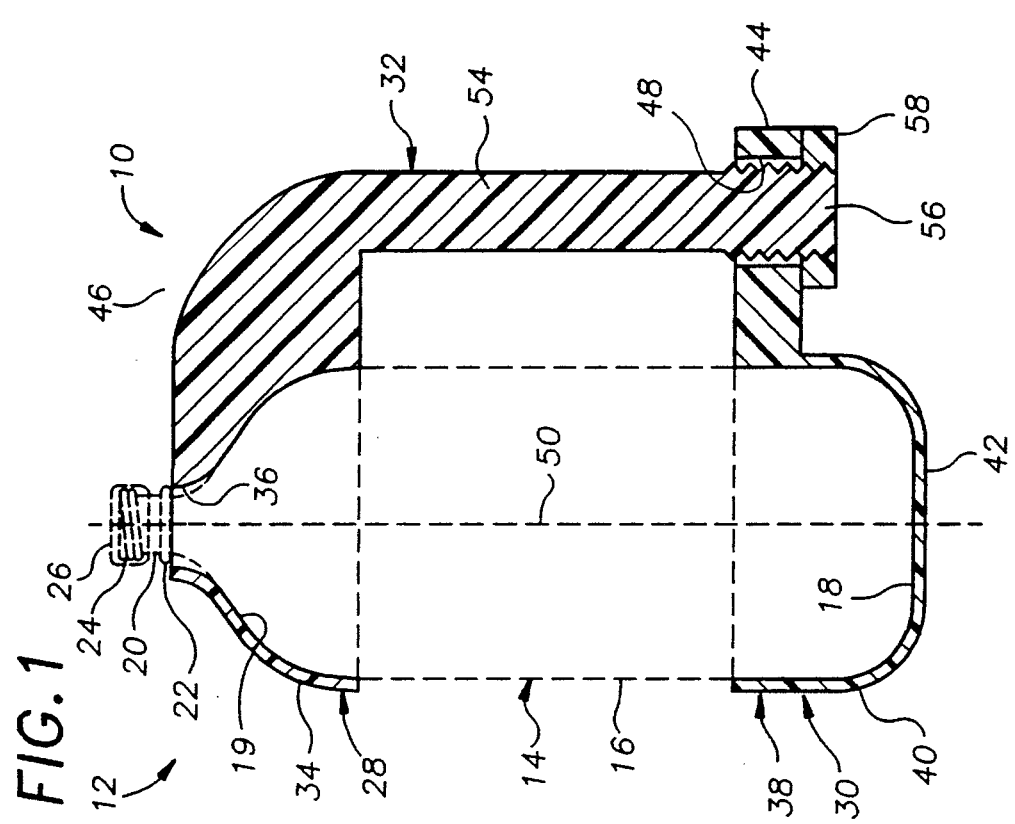

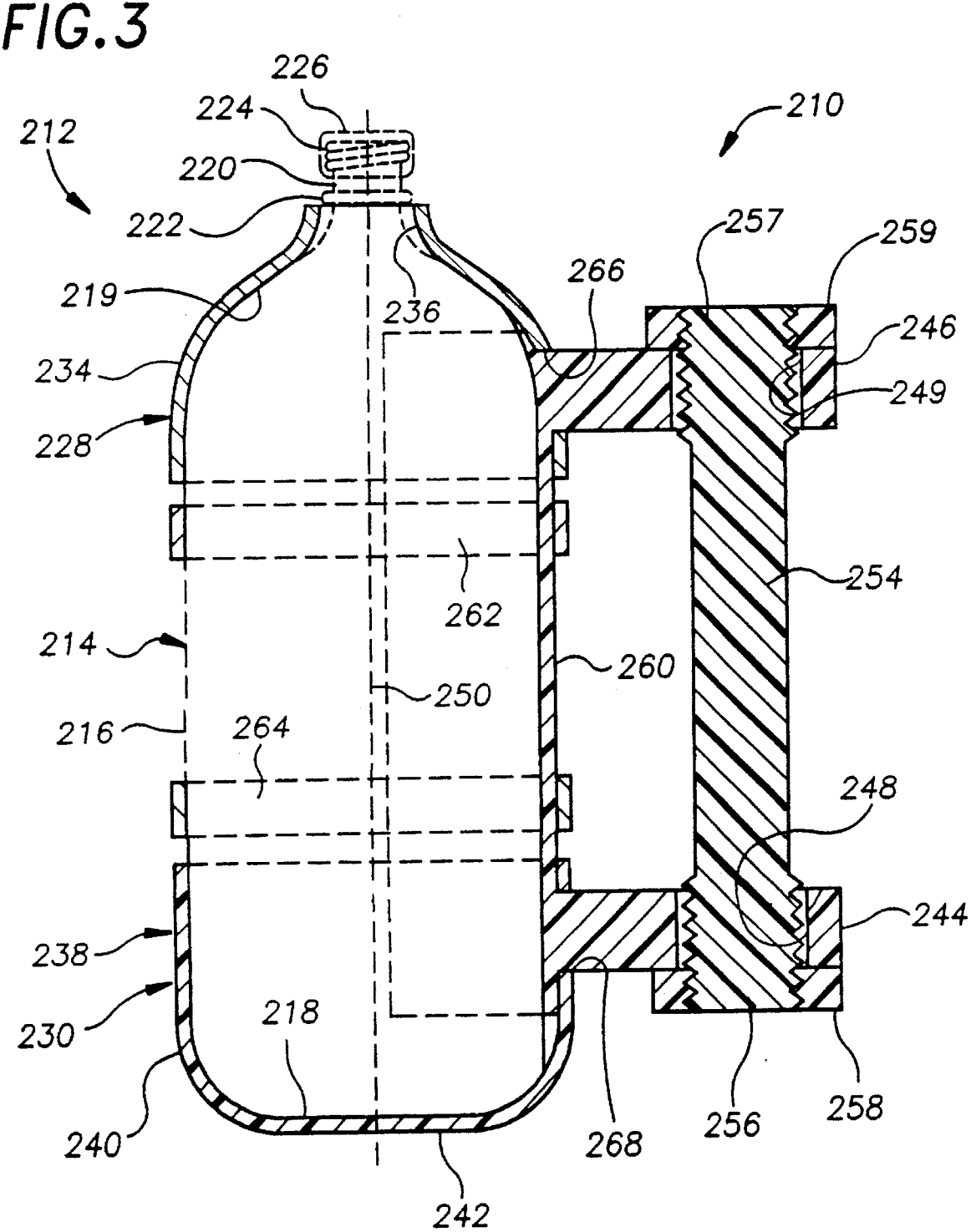

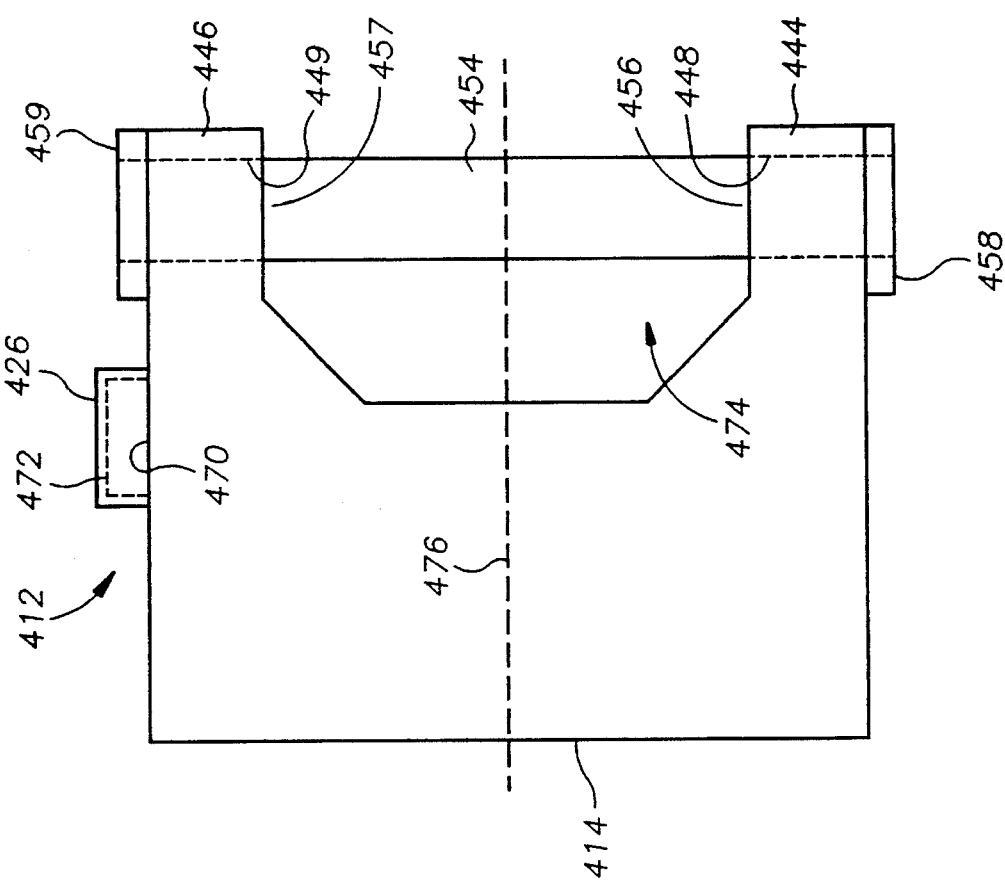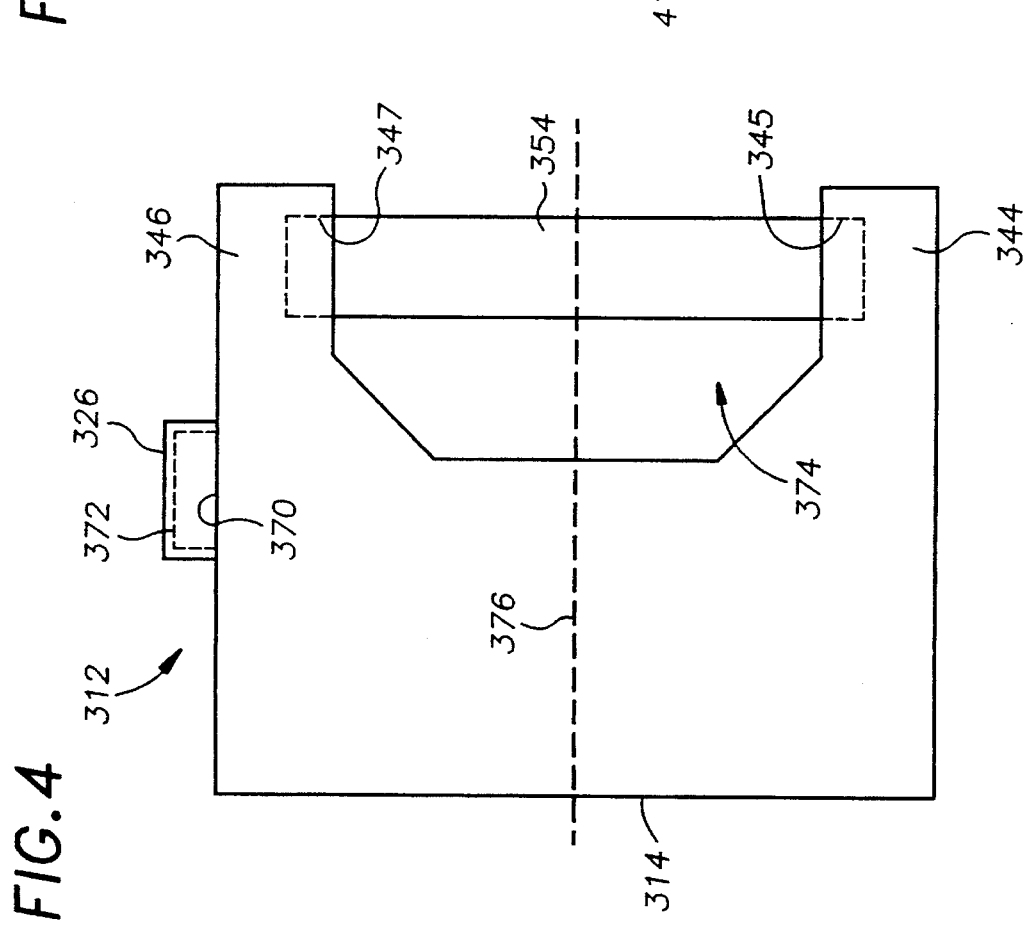

REFILLABLE DUMBBELL AND BOTTLE HOLDING DEVICE FOR FORMING A REFILLABLE DUMBBELL IN CONJUNCTION WITH A BOTTLE

BACKGROUND OF THE INVENTION

The present invention relates generally to a weightlifting device, and more particularly, is directed to a refillable dumbbell and a bottle holding device for forming a refillable dumbbell in conjunction with a bottle.

The use of conventional bottles for performing exercises is known. For example, in the March/April, 1994 issue of FITNESS magazine, an all-over body workout is disclosed and shown using water bottles as dumbbells. Generally, such bottles can be filled to provide weights ranging from approximately zero to eight pounds. Thus, such bottles are ideal, for example, to convalescing adults who need to start off with minimal amounts of weight for their therapy and which are convenient to use around the home.

However, a problem with using water bottles is that the water bottles have very narrow handles. As a result, the bottles by themselves are difficult to maneuver and grip in the various exercises. Still further, because of the narrowness of the handles, there will be a tendency for the handles to bend or break during exercises, particularly during dumbbell exercises which may provide large forces thereon.

Various devices for holding bottles are well known. Generally, these bottle holding devices are adapted to aid a person in pouring a liquid from a bottle held thereby. Accordingly, these bottle holding devices are constructed to hold a bottle in such a manner as to permit tilting of the bottle along the longitudinal axis thereof.

However, such bottle holding devices cannot practically be used to hold a bottle for use as a dumbbell. This is because, when used as a dumbbell, the forces applied to the bottle holding device from the weight of the bottle will vary at many different angles, rather than only along a tilting action extending along the longitudinal axis of the bottle.

For example, U.S. Pat. No. 4,666,197 discloses a bottle holding device having an upper gripping member with a hole thereof extending around the upper narrow neck of the bottle and below the annular flange thereat. A lower annular band slides along the bottle until it is situated near the lower end thereof where the bottle is much wider than the narrow neck. A handle connects the upper gripping member with the lower annular band.

However, because there is some play of the upper gripping member on the upper narrow neck of the bottle and there is some play of the lower annular band at the lower end of the bottle, and due to the sliding nature of both elements, any use of this bottle holding device as a dumbbell would result in the bottle continuously sliding back and forth by small amounts. In the extreme case, where the bottle is completely filled, the weight of the bottle may result in separation of the bottle from the bottle holding device. Further, because of the elongated opening in the upper gripping member, any use as a dumbbell would cause the bottle to move back and forth in such elongated opening. As a result, the bottle holding device of U.S. Pat. No. 4,666,197 is unusable, from a practical standpoint, as a dumbbell. In any event, U.S. Pat. No. 4,666,197 does not disclose or suggest in any manner that the same can be used as a dumbbell.

U.S. Pat. No. 4,379,578 discloses a similar arrangement, and suffers from the same deficiencies. Although this Patent discloses a locking region for the neck of the bottle, formed by projections in the elongated opening of the upper gripping member, there would still be a tendency for the neck of the bottle to escape such projections during a dumbbell exercise, in view of the filled weight of the bottle, the various angles that the bottle is turned, and the large forces applied during a dumbbell exercise. Further, there would still be longitudinal sliding of the bottle in the bottle holding device by a small amount, which would render the same unusable as a dumbbell.

U.S. Pat. No. 5,025,940 discloses a similar arrangement, and suffers from the same deficiencies. With this patent, a thin, lower annular band seats the bottom of the bottle. However, this is even more disadvantageous for use as a dumbbell because there is a greater tendency for the bottom of the bottle to escape the lower annular band completely when performing dumbbell exercises. See also U.S. Pat. No. Des. 292,160.

The problems with the above-mentioned bottle holding devices stem from the construction of the same as integral devices that must be deformed or slipped over the bottle. As a result, the above bottle holding devices cannot be tightened securely about the bottle.

Various other types of bottle holding devices are known for use in pouring the contents from a bottle. For example, bottle holding devices are known which only grip the neck of the bottle. See, for example, U.S. Pat. Nos. 4,773,549; 4,865,208; 4,901,874; and 4,932,544. Other bottle holding devices, on the other hand, are known which only grip the base or lower end of the bottle. See, for example, U.S. Pat. No. 4,972,964. Although insulated bottle holders are known, for example, from U.S. Pat. No. 4,708,254, there is no handle provided for use of the same as a dumbbell.

OBJECTS AND SUMMARY OF THE INVENTION

Accordingly, it is an object of the present invention to provide a refillable dumbbell and a bottle holding device for forming a refillable dumbbell in conjunction with a bottle, that avoids the aforementioned difficulties in the prior art.

It is another object of the present invention to provide a bottle holding device for securely holding a bottle in order to use the same as a dumbbell.

It is still another object of the present invention to provide a bottle holding device for forming a dumbbell in conjunction with a bottle, in which movement of the bottle within the bottle holding device is substantially eliminated for all movements of the bottle.

It is yet another object of the present invention to provide a refillable dumbbell and a bottle holding device for forming a refillable dumbbell in conjunction with a bottle, that is easily transported.

It is a further object of the present invention to provide a refillable dumbbell and a bottle holding device for forming a refillable dumbbell in which the amount of contents within the dumbbell container can be varied to change the weight of the dumbbell.

It is a still further object of the present invention to provide a refillable dumbbell and a bottle holding device for forming a refillable dumbbell in which the dumbbell is sufficiently strong.

It is a yet further object of the present invention to provide a refillable dumbbell and a bottle holding device for forming a refillable dumbbell in conjunction with a bottle, that is easy and economical to use and manufacture.

In accordance with an aspect of the present invention, a bottle holding device is provided for forming a refillable dumbbell in conjunction with a bottle of the type including a main body portion which is closed at a bottom thereof and which tapers at an upper portion thereof to a reduced diameter neck having a reclosable bottle opening. The bottle holding device includes upper bottle engaging means for engaging the tapered upper portion of the bottle, lower bottle engaging means for engaging the bottom of the bottle, and adjustable tensioning handle means for pulling the upper bottle engaging means and the lower bottle engaging means toward each other with an adjustable force when the bottle holding device is assembled with the bottle, so as to tightly grip the bottle therebetween, and for enabling a person to grasp the tensioning handle means to perform dumbbell exercises.

Preferably, the upper bottle engaging means includes a thin-walled, annular tapered portion corresponding in general shape to the tapered upper portion of the bottle so as to provide a wedge-like engagement of the tapered upper portion when positioned thereover and tensioned. In addition, the lower bottle engaging means includes a cup-like body with a thin-walled, annular side wall and a closed bottom wall so as to provide engagement of the main body portion and the bottom thereof when positioned thereover and tensioned.

The tensioning handle means includes a lower lateral extension which extends outwardly from the lower bottle engaging means, an upper lateral extension which extends outwardly from the upper bottle engaging means, and a handle tightened between the lower lateral extension and the upper lateral extension so as to pull the lower and upper lateral extensions toward each other when the bottle holding device is assembled with the bottle, and thereby, to pull the upper bottle engaging means and the lower bottle engaging means toward each other when the bottle holding device is assembled with the bottle so as to tightly grip the bottle therebetween.

The bottle has a longitudinal central axis, and the handle is arranged substantially parallel to the longitudinal central axis.

In a first embodiment, the handle has one end fixedly connected with one of the upper and lower lateral extensions, and the other of the upper and lower lateral extensions includes a handle opening therein for receipt of an opposite end of the handle therein, and the tensioning handle means further includes tightening means for tightening the opposite end of the handle with respect to the other of the upper and lower lateral extensions. In such case, the opposite end of the handle has external threads thereon, and the tightening means includes a locking nut threadedly engageable with the opposite end of the handle extending out of the handle opening.

In the second and third embodiments, each of the upper and lower lateral extensions includes a handle opening therein for receipt of an opposite end of the handle therein, and the tensioning handle means further includes tightening means for tightening the opposite ends of the handle with respect to the upper and lower lateral extensions. In such case, the opposite ends of the handle are threaded, and the tightening means includes first and second locking nuts for threadedly engaging the threaded opposite ends of the handle.

In accordance with another aspect of the present invention, a bottle holding device is provided for forming a refillable dumbbell in conjunction with a bottle of the type including a main body portion which is closed at a bottom thereof and which tapers at an upper portion thereof to a reduced diameter neck having a reclosable bottle opening, the bottle holding device including upper bottle engaging means for engaging the upper portion of the bottle, the upper bottle engaging means having a transverse opening therein, lower bottle engaging means for engaging the bottom of the bottle, the lower bottle engaging means having a transverse opening therein, and handle assembly means for engaging the bottle and for enabling a person to grasp the handle assembly means to perform dumbbell exercises, the handle assembly means including wall means for engaging an outer wall of the bottle, securing means for securing the wall means about the main body portion of the bottle, an upper lateral extension connected with the wall means and extending through the transverse opening of the upper bottle engaging means, a lower lateral extension connected with the wall means and extending through the transverse opening of the lower bottle engaging means, and handle means for connecting distal ends of the upper and lower lateral extensions.

Preferably, the wall means includes an arcuate wall extending for an arcuate length of about 180°.

Further, the securing means includes at least one strap means for wrapping about the bottle and the wall means to secure the wall means to the bottle.

In accordance with still another aspect of the present invention, a refillable dumbbell includes a container having a reclosable opening, the container being configured to be substantially symmetrical about a mid-plane thereof, and the container having an external gripping recess which is substantially symmetrical about the mid-plane thereof and which defines an upper lateral extension and a lower lateral extension, and a handle secured at opposite ends thereof to the upper and lower lateral extensions, respectively, the handle being arranged substantially symmetrical with respect to the mid-plane.

Preferably, the external gripping recess has a configuration of a combination of a trapezoidal area having two parallel sides, one being longer than the other, and a rectangular area, with a long side of the rectangular area being coincident with the longer parallel side of the trapezoidal area. The handle is positioned in the rectangular area, substantially parallel to the long sides thereof.

In the fourth embodiment, the upper lateral extension and the lower lateral extension each have a recess therein, and the opposite ends of the handle are fixed in the recesses of the upper lateral extension and the lower lateral extension, respectively.

In the fifth embodiment, each of the upper and lower lateral extensions includes an opening therein for receipt of an opposite end of the handle therethrough, and further including tightening means for tightening the opposite ends of the handle with respect to the upper and lower lateral extensions. In such case, the opposite ends of the handle are threaded, and the tightening means includes first and second locking nuts for threadedly engaging the threaded opposite ends of the handle.

In accordance with yet another aspect of the present invention, a refillable dumbbell according to a sixth embodiment of the invention includes a container having a reclosable opening and a mid-plane which substantially divides the container in half, an upper lateral extension extending transversely from an upper end of the container, a lower lateral extension extending transversely from a lower end of the container, the upper and lower lateral extensions being arranged substantially symmetrically about the mid-plane, and a handle secured at opposite ends thereof to the upper and lower lateral extensions, respectively, the handle being arranged substantially symmetrical with respect to the midplane.

Preferably, the handle and the upper and lower lateral extensions are hollow and communicate with an inner cavity of the container.

The above and other objects, features and advantages of the invention will become readily apparent from the following detailed description thereof which is to be read in connection with the accompanying drawings.

BRIEF DESCRIPTION OF THE DRAWINGS

FIG. 1 is a longitudinal cross-sectional view of a refillable dumbbell formed by a bottle holding device according to a first embodiment of the present invention, shown holding a bottle in phantom;

FIG. 2 is a longitudinal cross-sectional view of a refillable dumbbell formed by a bottle holding device according to a second embodiment of the present invention, shown holding a bottle in phantom;

FIG. 3 is a longitudinal cross-sectional view of a refillable dumbbell formed by a bottle holding device according to a third embodiment of the present invention, shown holding a bottle in phantom;

FIG. 4 is an elevational view of a refillable dumbbell according to a fourth embodiment of the present invention;

FIG. 5 is an elevational view of a refillable dumbbell according to a fifth embodiment of the present invention.

DETAILED DESCRIPTION OF THE PREFERRED EMBODIMENTS

Figure 6:
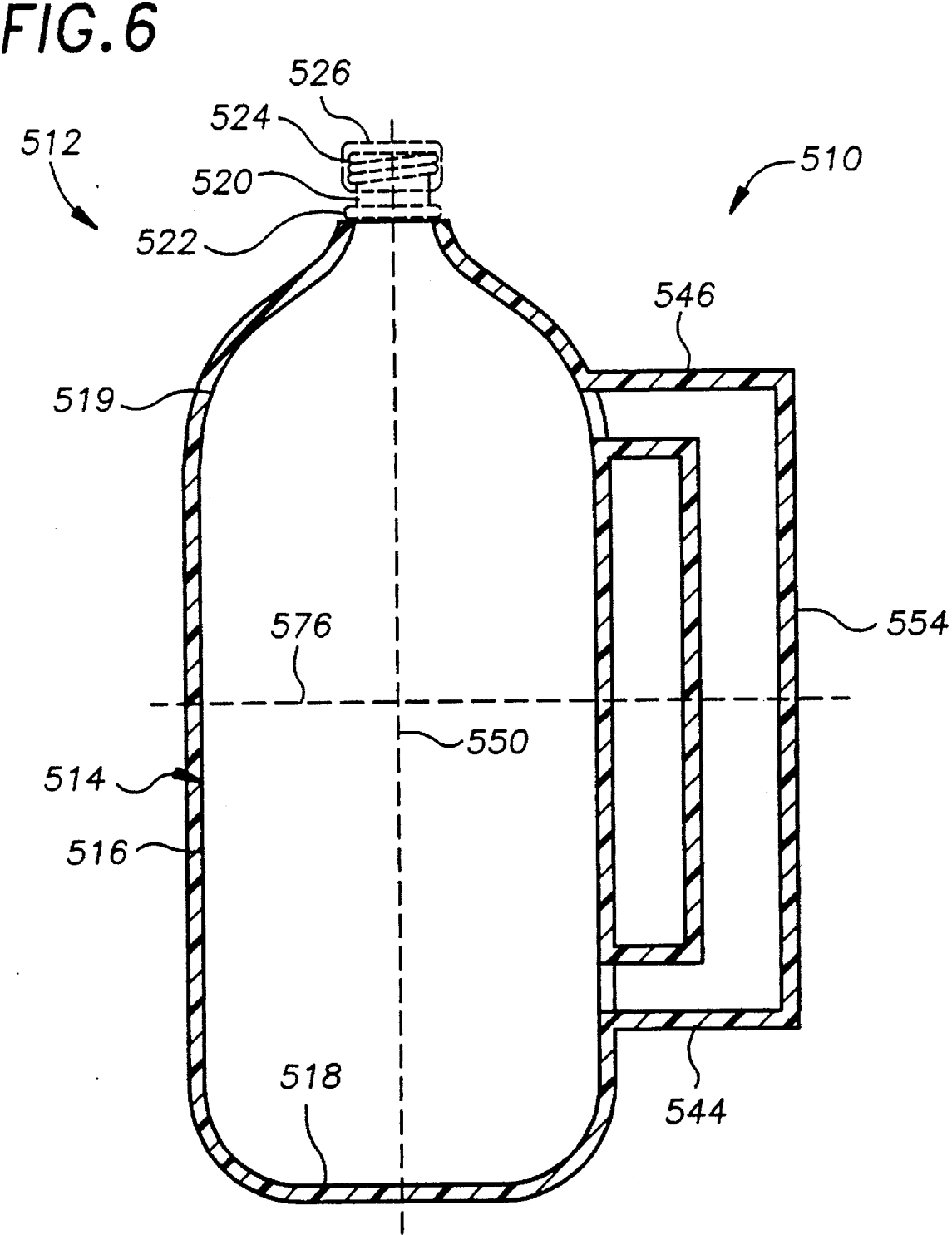
FIG. 6 is a longitudinal cross-sectional view of a refillable dumbbell according to a sixth embodiment of the present invention.

Referring to the drawings in detail, and initially to FIG. 1 thereof, there is shown a bottle holding device 10 according to a first embodiment of the present invention, for forming a refillable dumbbell 12 in conjunction with a bottle 14.

As shown, bottle 14 is a conventional plastic bottle used for holding soda, water or the like. For example, bottle 14 can have a capacity of two or three liters, although any other size and capacity bottle can be used. Bottle 14 has a main cylindrical body portion 16 which is closed at the bottom 18 thereof. Bottom 18 may be recessed inwardly of body portion 16, as is conventional. Body portion 16 tapers in diameter in an upper portion 19 of bottle 14 and terminates in a reduced diameter neck 20. Generally, an annular flange 22 is provided on reduced diameter neck 20, and external threads 24 are provided above annular flange 22 for receiving a threaded closure cap 26 thereon.

Bottle holding device 10 includes an upper bottle engaging section 28, a lower bottle engaging section 30 and a tensioning handle section 32 which pulls upper bottle engaging section 28 and lower bottle engaging section 30 toward each other so as to tightly grip bottle 14 therebetween. Upper bottle engaging section 28, lower bottle engaging section 30 and tensioning handle section 32 are each preferably made from a rigid plastic material, although any other suitable material, such as a metal, metal alloy or the like can be used.

Upper bottle engaging section 28 includes a thin-walled, annular tapered portion 34 corresponding in general shape to upper tapered portion 19. However, it is not necessary that annular tapered portion 34 have the exact shape as the upper bottle engaging section 28 of the bottle 14 with which it is used, but rather, it is only required that annular tapered portion 34 be tapered so as to provide a wedge-like engagement of upper tapered portion 19 when positioned thereover and tensioned. It will be appreciated that the upper open end 36 of annular tapered portion 34 has an inner diameter slightly greater than that of annular flange 22 so as to fit thereover.

Lower bottle engaging section 30 includes a cup-like body 38 with a thin-walled, annular side wall 40 and a closed bottom wall 42. The inner diameter of lower bottle engaging section 30 is slightly larger than bottom 18 of bottle 14 to receive bottle 14 therein.

Tensioning handle section 32 includes a lower lateral extension 44 which extends outwardly from lower bottle engaging section 30 and an upper lateral extension 46 which extends outwardly from upper bottle engaging section 28. Preferably, lower lateral extension 44 is formed integrally with lower bottle engaging section 30 and upper lateral extension 46 is formed integrally with upper bottle engaging section 28.

Lower lateral extension 44 includes an opening 48 at a distal portion thereof, with the axis of opening 48 being parallel with the central axis of lower bottle engaging section 30 and with the central longitudinal axis 50 of bottle 14, in the assembled condition.

Upper lateral extension 46 is preferably integrally formed with upper bottle engaging section 28. A cylindrical tensioning handle 54 is integrally formed with upper lateral extension 46 and is arranged parallel with the central axis of upper bottle engaging section 28 and with central longitudinal axis 50 of bottle 14, in the assembled condition. When upper bottle engaging section 28 is positioned over upper tapered portion 19 and when lower bottle engaging section 30 is positioned below the lower portion of main cylindrical body portion 16, the distal or free end 56 of tensioning handle 54 extends through opening 48. The free end 56 of tensioning handle 54 which extends out of opening 48 is externally threaded, and a locking nut 58 is threadedly received on the threaded free end 56 of tensioning handle 54.

As locking nut 58 is tightened on threaded free end 56, upper bottle engaging section 28 and lower bottle engaging section 30 are pulled toward each other. As a result, there is a tight wedge-like engagement of upper tapered portion 19 of bottle 14, and a tightening of lower bottle engaging section 30 on the lower portion of main cylindrical body portion 16 of bottle 14.

With this arrangement, upper closure cap 26 can be removed and bottle 14 can be filled to any desired capacity with a liquid, such as water, or a solid, such as sand, or the like. Then, it is only necessary for the user to grasp handle 54 to perform a dumbbell exercise. Because bottle 14 is securely held in a tightened manner between upper and lower bottle engaging sections 28 and 30, there is virtually no play of bottle 14.

Referring now to FIG. 2, there is shown a bottle holding device 110 according to a second embodiment of the present invention, for forming a refillable dumbbell 112 in conjunction with a bottle 114. Bottle holding device 110 is similar to bottle holding device 10 of FIG. 1, and accordingly, the same reference numerals are used to designate common elements, but augmented by 100.

Specifically, tensioning handle 154 is formed as a separate element, rather than being integrally formed with upper lateral extension 146. Thus, upper lateral extension 146 also includes an opening 149 at a distal portion thereof, with the axis of opening 149 being parallel with the central axis of upper bottle engaging section 128 and with the longitudinal axis 150 of bottle 114 in the assembled condition. Further, in addition to threaded free end 156, the opposite free end 157 of handle 154 is also threaded.

When upper bottle engaging section 128 is positioned over upper tapered portion 119 and when lower bottle engaging section 130 is positioned over the lower portion of main cylindrical body portion 116 and bottom 118, the distal or free end 156 of tensioning handle 154 extends through opening 148 and the distal or free end 157 of tensioning handle 154 extends through opening 149. In this manner, a locking nut 158 is threadedly received on the threaded free end 156 of tensioning handle 154 and a locking nut 159 is threadedly received on the opposite threaded free end 157 of tensioning handle 154. As locking nuts 158 and 159 are tightened on threaded free ends 156 and 157, upper bottle engaging section 128 and lower bottle engaging section 130 are pulled toward each other. As a result, there is a tight wedge-like engagement of upper bottle engaging section 128 with upper tapered portion 119 of bottle 114, and a tightening of lower bottle engaging section 130 on the lower portion of main cylindrical body portion 116 of bottle 114.

Referring now to FIG. 3, there is shown a bottle holding device 210 according to a third embodiment of the present invention, for forming a refillable dumbbell 212 in conjunction with a bottle 214. Bottle holding device 210 is similar to bottle holding device 110 of FIG. 2, and accordingly, the same reference numerals are used to designate common elements, but augmented by 100.

With bottle holding device 210, lower lateral extension 244 and upper lateral extension 246 are formed separate from upper bottle engaging section 228 and lower bottle engaging section 230, respectively.

Specifically, the inner ends of lower lateral extension 244 and upper lateral extension 246 are integrally connected to the outer surface at lower and upper ends, respectively, of a part cylindrical, arcuate wall 260 which has the same arcuate shape as bottle 214 to be used therewith. Preferably, arcuate wall 260 has a height extending along the height of main cylindrical body portion 216 of bottle 214 and extends therearound for an arcuate length of about 180°, although other arcuate lengths can be used. Upper and lower straps 262 and 264, respectively, secure arcuate wall 260 around bottle 214. Straps 262 and 264 can be secured by any suitable means, such as the fastening system known as "VELCRO", snaps, buckles or any other suitable releasable fasteners, around arcuate wall 260 and main cylindrical body 216 of bottle 214, in order to securely hold arcuate wall 260 to bottle 214.

As with the second embodiment of FIG. 2, tensioning handle 254 is formed as a separate element, rather than being integrally formed with upper lateral extension 246. Thus, upper lateral extension 246 also includes an opening 249 at a distal portion thereof, with the axis of opening 249 being parallel with the central axis of upper bottle engaging section 228 and with the longitudinal axis 250 of bottle 214 in the assembled condition. Further, handle 254 is formed with opposite threaded free ends 256 and 257. Free end 256 of tensioning handle 254 extends through opening 248 in lower lateral extension 244 and free end 257 of tensioning handle 254 extends through opening 249 in upper lateral extension 246. In this manner, a locking nut 258 is threadedly received on the threaded free end 256 of tensioning handle 254 and a locking nut 259 is threadedly received on the opposite threaded free end 257 of tensioning handle 254 so that handle 254 can be secured to upper bottle engaging section 228 and lower bottle engaging section 230.

Further, upper bottle engaging section 228 includes a thin-walled, annular tapered portion 234 corresponding in general shape to upper tapered portion 219 of bottle 214, as with annular tapered portion 34 of the first embodiment. An opening 266 is provided at a lower end of annular tapered portion 234, with upper lateral extension 246 extending therethrough.

Lower bottle engaging section 230 includes a cup-like body 238 with a thin-walled, annular side wall 240 and a closed bottom wall 242, as with cup-like body 38 of the first embodiment. An opening 268 is provided at an upper end of side wall 240, with lower lateral extension 244 extending therethrough.

With this arrangement, the tensioning effect is achieved by lower and upper lateral extensions 244 and 246 extending through openings 268 and 266, respectively, and by handle 254 tightened within lower and upper lateral extensions 244 and 246. Specifically, during a dumbbell exercise, any tendency of arcuate wall 260 to move downwardly with respect to bottle 214, is restrained by upper lateral extension 246 extending from opening 266 and thus being restrained by upper bottle engaging section 228. In like manner, during a dumbbell exercise, any tendency of arcuate wall 260 moving upwardly with respect to bottle 214 is restrained by lower lateral extension 244 extending from opening 268 and thus being restrained by lower bottle engaging section 230.

Thus, there is virtually no play of bottle 214 because bottle 214 is securely held in a tightened manner between upper and lower bottle engaging sections 228 and 230.

To assemble the same, lower and upper lateral extensions 244 and 246 are first inserted through openings 268 and 266, respectively. Then, lower bottle engaging section 230 is positioned around bottom 218 of bottle 214 and upper bottle engaging section 228 is positioned around upper tapered portion 219 of bottle 214. Thereafter, arcuate wall 260 is positioned against bottle 214, and straps 262 and 264 are used to secure arcuate wall 260 in position. Then, handle 254 is inserted in lower and upper lateral extensions 244 and 246, and tightened therein by means of locking nuts 258 and 259.

Further, in the third embodiment of FIG. 3, upper and lower bottle engaging sections 228 and 230 can be made from a fabric material, as shown, if desired. Alternatively, they can be made from plastic, metal or any other suitable material.

It will be appreciated that, with the first three embodiments described above with respect to FIGS. 1–3, a conventional bottle 14, 114 or 214 is used to form a refillable dumbbell 12, 112 or 212, by a bottle holding device 10, 110 or 210 that securely holds the bottle so that it can be used in a dumbbell exercise. In order that the bottle holding devices can be used with different sized bottles, inserts (not shown) can be provided to fit within the upper and lower bottle engaging sections. In this regard, each insert would have an inner shape to conform to the bottle to be used and would have an outer shape to conform to the inner shape of the respective upper and lower bottle engaging sections.

Referring now to FIG. 4, there is shown a refillable dumbbell 312 according to a fourth embodiment of the present invention. Dumbbell 312 is different from the aforementioned embodiments in that a conventional bottle is not used, but rather, a refillable container 314 is provided. Basically, refillable container 314 can have any suitable shape, such as a cylindrical shape, a cubic shape or the like. An opening 370 is formed in container 314 and is surrounded by an outwardly extending threaded boss 372, which is removably covered by a threaded closure cap 326. Thus, the weight of dumbbell 312 can be varied, as with the first three embodiments.

Container 314 is formed with a cut-away or recessed area 374 defining a lower lateral extension 344 and an upper lateral extension 346. Recessed area 374 is shown to have a combination of a trapezoidal area having two parallel sides, one being longer than the other, and a rectangular area, with a long side of the rectangle being coincident with the longer parallel side of the trapezoidal area. However, recessed area 374 is not limited by this configuration.

A handle 354 is fixedly secured within recesses 345 and 347 of lower lateral extension 344 and an upper lateral extension 346, respectively, so as to be symmetrically arranged with respect to container 314. Handle 354 is arranged within the rectangular portion of recessed area 374.

As will be appreciated, container 314 is configured to be substantially symmetrical about a transverse mid-plane 376, with recess 374 also being substantially symmetrical about mid-plane 376. Since handle 354 is also substantially symmetrical about mid-plane 376, there is no problem of balancing the dumbbell, as with a conventional bottle having a small, offset handle. Further, handle 354 can be made relatively thick to prevent bending or breaking of handle 354 during dumbbell exercises.

Thus, a person can grasp handle 354 within recessed area 374 and thereby perform a dumbbell exercise. Further, the weight of the dumbbell can be varied by changing the amount of contents within container 314.

Referring now to FIG. 5, there is shown a refillable dumbbell 412 according to a fifth embodiment of the present invention, in which elements corresponding to those of refillable dumbbell of FIG. 4 are identified by the same reference numerals, augmented by 100.

Refillable dumbbell 412 differs from refillable dumbbell 312 in the connection of handle 454. Specifically, handle 454 is connected in a similar manner to handle 154 of the second embodiment of FIG. 2. Thus, lower and upper lateral extensions 444 and 446 include openings 448 and 449, respectively, with the axes of openings 448 and 449 being parallel with the longitudinal axis of container 414. The opposite free ends 456 and 457 of handle 454 are also threaded.

The distal or free end 456 of handle 454 extends through opening 448 and the distal or free end 457 of handle 454 extends through opening 449. In this manner, a locking nut 458 is threadedly received on the threaded free end 456 of handle 454 and a locking nut 459 is threadedly received on the opposite threaded free end 457 of handle 454. Thus, as nuts 458 and 459 are tightened, handle 454 is fixedly secured to lower lateral extension 444 and upper lateral extension 446, so as to be symmetrically arranged with respect to container 414.

Referring now to FIG. 6, there is shown a refillable dumbbell 512 according to a sixth embodiment of the present invention, in which elements corresponding to those of refillable dumbbell of FIG. 1 are identified by the same reference numerals, augmented by 500.

Refillable dumbbell 512 differs from refillable dumbbell 12 in the fact that a conventional bottle 514 is provided with an integral hollow handle 554. Specifically, a lower lateral extension 544 extends transversely from a lower end of container 514, and an upper lateral extension 546 extends transversely from an upper end of container 514, with lower and upper lateral extensions 544 and 546 being arranged substantially symmetrically about a plane 576 which is substantially a mid-plane of bottle 514. A handle 554 is secured at opposite ends thereof to lower and upper lateral extensions 544 and 546, respectively, handle 554 being arranged substantially symmetrical with respect to mid-plane 576.

Preferably, as shown in FIG. 6, handle 554 and lower and upper lateral extensions 544 and 546 are hollow and communicate with the inner cavity of container 514. However, it is possible to make handle 554 and lower and upper lateral extensions 544 and 546 as solid members.

Thus, unlike conventional bottles, handle 554 is symmetrically arranged with respect to mid-plane 576. As a result, refillable dumbbell 512 can be used as a dumbbell, as well as a conventional bottle. This differs from conventional bottles having integral handles in which the handles are offset toward the upper end, thereby preventing the same from being used as a dumbbell.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A bottle holding device for forming a refillable dumbbell in conjunction with a bottle of the type including a main body portion which is closed at a bottom thereof and which tapers at an upper portion thereof to a reduced diameter neck having a reclosable bottle opening, the bottle extending along an axial direction thereof, said bottle holding device comprising:

upper bottle engaging means for engaging the tapered upper portion of the bottle, an upper lateral extension which extends outwardly from said upper bottle engaging means, lower bottle engaging means for engaging the bottom of the bottle, a lower lateral extension which extends outwardly from said lower bottle engaging means, and adjustable tensioning handle means for:

pulling said upper bottle engaging means and said lower bottle engaging means toward each other with an adjustable force after said bottle holding device is assembled with the bottle, to tightly grip the bottle therebetween to permit movement during a dumbbell exercise, and enabling a person to grasp said tensioning handle means between said upper engaging means and said lower bottle engaging means to perform dumbbell exercises, said adjustable tensioning handle means including:

a handle tightened between said lower lateral extension and said upper lateral extension so as to pull said lower and upper lateral extensions toward each other when said bottle holding device is assembled with the bottle, and thereby, to pull said upper bottle engaging means and lower bottle engaging means toward each other when said bottle holding device is assembled with the bottle so as to tightly grip the bottle therebetween, said handle extending substantially parallel to be axial direction of the bottle and including at least one end with threads thereon, a handle opening in at least one of said upper and lower lateral extensions for receipt of an end of said handle therein, with the handle extending out of each opening, and a locking nut releasably engaged with each end of said handle extending out of a respective said handle opening, for tightening said extending ends of said handle as to the respective lateral extension so as to pull said upper and lower bottle engaging means toward each other when said bottle holding device is assembled with the bottle so as to tightly grip the bottle therebetween;

said adjustable tensioning handle means being fixed in position and immovable with respect to said upper bottle engaging means and said lower bottle engaging means when said bottle holding device is assembled with the bottle, and when a person grasps the adjustable tensioning handle means and performs a dumbbell exercise.

2. A bottle holding device according to claim 1, wherein said upper bottle engaging means includes a thin-walled, annular tapered portion corresponding in general shape to the tapered upper portion of the bottle so as to provide a wedge-like engagement of the tapered upper portion when positioned thereover and tensioned.

3. A bottle holding device according to claim 1, wherein said lower bottle engaging means includes a cup-like body with a thin-walled, annular side wall and a closed bottom wall so as to provide engagement of the main body portion and the bottom thereof when positioned thereover and tensioned.

4. A bottle holding device according to claim 1, wherein said handle has one end fixedly connected with said upper lateral extension, and the lower lateral extension includes said handle opening therein for receipt of an opposite end of said handle therein.

5. A bottle holding device according to claim 1, wherein each of said upper and lower lateral extensions includes said handle opening therein for receipt of an end of said handle therein.

6. A bottle holding device according to claim 5, wherein opposite ends of said handle are threaded, and there are first and second said locking nuts for threadedly engaging said threaded opposite ends of said handle.

* * * * *

UNITED STATES PATENT AND TRADEMARK OFFICE
CERTIFICATE OF CORRECTION

PATENT NO. : 5,580,343
DATED : December 3, 1996
INVENTOR(S) : Harry A. Cafiero

It is certified that error appears in the above-indentified patent and that said Letters Patent is hereby corrected as shown below:

Column 10, line 55, after "upper" insert -- bottle --;
           line 64, after "and" insert -- said --.

Column 11, line 2, change "be" to -- the --.

Signed and Sealed this

Fourth Day of March, 1997

Attest:

BRUCE LEHMAN

Attesting Officer     Commissioner of Patents and Trademarks